US006985194B2

(12) United States Patent
Kawano et al.

(10) Patent No.: US 6,985,194 B2
(45) Date of Patent: Jan. 10, 2006

(54) MATRIX ARRAY SUBSTRATE

(75) Inventors: Hideo Kawano, Tokyo (JP); Motoyuki Kitabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 841 days.

(21) Appl. No.: 09/897,955

(22) Filed: Jul. 5, 2001

(65) Prior Publication Data

US 2002/0054037 A1     May 9, 2002

(30) Foreign Application Priority Data

| Jul. 10, 2000 | (JP) | ............................. 2000-208614 |
| Oct. 19, 2000 | (JP) | ............................. 2000-319948 |

(51) Int. Cl.
  *G02F 1/1333* (2006.01)
  *G02F 1/1343* (2006.01)

(52) U.S. Cl. ............................. 349/54; 349/38; 349/39

(58) Field of Classification Search .................. 349/54, 349/38, 39, 158, 160
See application file for complete search history.

(56) References Cited

U.S. PATENT DOCUMENTS

| 5,517,341 A | * | 5/1996 | Kim et al. ..................... 349/42 |
| 5,691,786 A | * | 11/1997 | Nakai ........................... 349/39 |
| 5,747,095 A | * | 5/1998 | McAllister et al. ............. 427/8 |
| 6,833,882 B2 | * | 12/2004 | Lee .............................. 349/43 |

* cited by examiner

*Primary Examiner*—Robert Kim
*Assistant Examiner*—Mike Qi
(74) *Attorney, Agent, or Firm*—Oblon, Spivak, McClelland, Maier & Neustadt, P.C.

(57) ABSTRACT

In matrix array substrate for flat-panel display devices or the like in which a repair circuit for connecting a defected pixel electrode and next electrode in a tandem is disposed between the two pixel electrodes, a contact hole for connecting one of connector electrodes of the repair circuit to one of the pixel electrodes is disposed within contours of a scanning line. Meanwhile, in a matrix array substrate for normally white mode flat-panel display devices, an island metal pattern is disposed within the contours of a scanning line and within a storage-capacity-forming portion extended from one of the two electrodes. The island metal pattern is formed simultaneously with signal line and has a scanning-line-wise size larger than width of the scanning line.

6 Claims, 6 Drawing Sheets

FIG. 1

FIG. 2 FIRST EMBODIMENT

SECOND EMBODIMENT

FIG. 6

PRIOR ART

MATRIX ARRAY SUBSTRATE

BACKGROUND OF THE INVENTION

This invention relates to a matrix array substrate for flat-panel display devices or the like and typically for liquid-crystal display devices.

Recently, flat-panel display devices such as liquid crystal display devices have been used as image display devices for personal computers, word processor-dedicated machines, television set, and the like because of their features that they are thin and light-weighted and consume a small electric power.

Active-matrix liquid crystal display (active-matrix LCD) devices in particular, which has pixel-switching elements arranged on each display pixel, enables to achieve good image quality without crosstalk between adjacent pixels. Because of these features, active matrix liquid crystal display devices are being earnestly investigated and developed.

In following, a light transmissive type device of the active-matrix LCD device is exemplified for explanation on its construction.

An active-matrix LCD device is comprised of a matrix array substrate (hereinafter referred as array substrate) and a counter substrate, which are closely opposed to each other with a predetermined gap, and of a liquid crystal layer held in the gap.

The array substrate has signal lines, for example in an upper-layer metal wiring pattern, and scanning lines, for example in a lower-layer metal wiring pattern. The signal and scanning lines are arranged in a latticework on an insulator substrate such as a glass plate, and are superimposed thorough an insulator film therebetween. On each rectangular patch defined by the signal and scanning lines, a pixel electrode is disposed and formed of a transparent electro conductive material such as Indium-doped tin oxide (ITO). At around each crossing of the signal and scanning lines, a pixel-switching element is disposed for controlling a respective pixel electrode. When the pixel-switching element is a thin film transistor (TFT), gate and signal electrodes of the TFT are respectively connected with scanning and signal lines a source electrode of the TFT is connected with a pixel electrode.

The counter substrate has a counter electrode formed of a transparent electro conductive material such as Indium-doped tin oxide (ITO), on an insulator substrate such as a glass plate. When to realize color display, color filter layers are formed on the substrate.

For securing a high quality of displaying on the active-matrix LCD device, each pixel electrode has to have a sufficient storage capacity (Cs). Thus, formerly, a storage capacitor line is arranged at between every two adjacent scanning lines as extended along the scanning lines. The storage capacitor lines are formed in a process step for forming the scanning lines. However, the storage capacitor causes decrease of an aperture ratio or light transmissive-area ratio of each pixel area.

For this reason, in a technique of the prior art, a metal float pattern for forming the storage capacity is provided for each pixel electrode on an area overlapping the scanning line and is connected to the pixel electrode through a contact hole.

In such construction, the pixel electrode may be short-circuited with the scanning line through a pinhole of a gate insulator film, which may be formed by a contamination particle at exposure process for forming resist pattern. Such short circuit causes decrease of yield of the array substrate, that is, ratio of salable product among all the produced.

Thus, there becomes increasingly prevailing a construction of forming the storage capacitor between the scanning line and an extended portion of the pixel electrode without forming the float pattern.

Meanwhile, the array substrate is completed after a plurality of film forming and patterning processes, and is usually subjected to inspection process at the time of completion. By the process, disconnection, short circuit and/or defect are detected if any.

At the inspection process, if pixel defects due to malfunction of pixel switching element is detected, the pixel defect is "repaired" by connecting the defected pixel electrode to a next pixel electrode, which neighbors the defected pixel electrode from a scanning-line-wise direction. A circuit for such repairing is referred as "tandem repair circuit".

Figure 6:
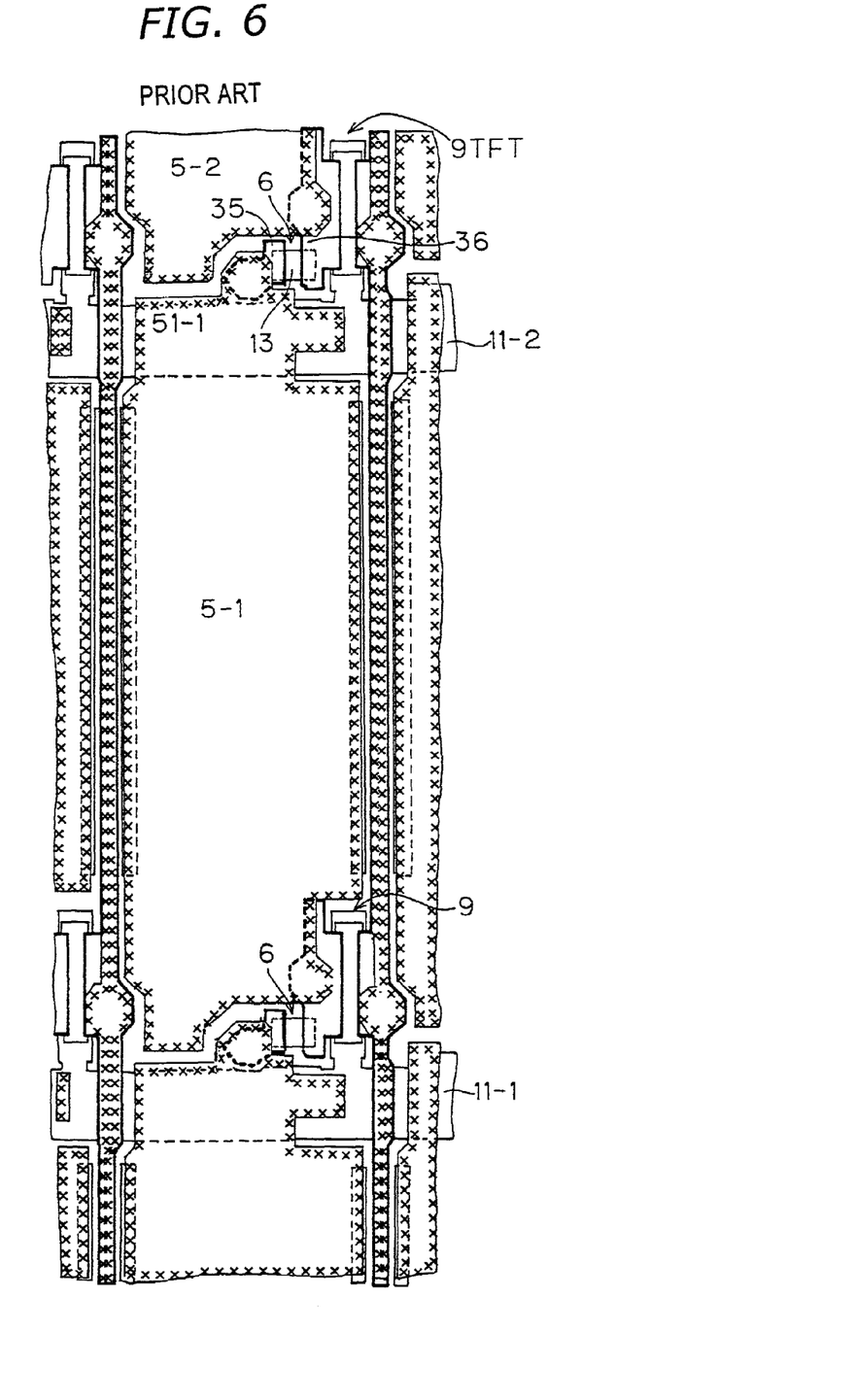
FIG. 6 is a schematic partial plan view corresponding the FIG. 1, showing a construction of a prior art array substrate.

FIG. 6 shows a construction of an array substrate in the prior art.

A pixel electrode 5-1 is sandwiched between two consecutive scanning lines 11-1 and 11-2. One scanning line 11-2 among them is not for switching the pixel electrode 5-1 and is to be referred as "pre-scan-row scanning line", which means a scanning line for scanning a next row of pixel electrodes in advance of scanning a row of pixel electrodes including the pixel electrode 5-1. An extended portion 51-1 extended from the pixel electrode 5-1 overlaps the pre-scan-row scanning line 11-2 to just cross over the scanning line 11-2. A tandem repair circuit 6 is disposed between the extended portion 51-1 and a "pre-scan-row electrode" 5-2 that is driven by the pre-scan-row scanning line 11-2. The tandem repair circuit 6 is for electrically connecting one pixel electrode 5-1 to the "pre-scan-row electrode" 5-2, if and only if a TFT for driving the pre-scan-row electrode 5-2 malfunctions.

The tandem repair circuit 6 is comprised of; first connector electrode 35 that is connected through a contact hole to the extended portion 51-1 extended from the pixel electrode 5-1; second connector electrode 36 connected with the pre-scan-row electrode 5-2; and a float pattern 13 bridging between these connector electrodes 35,36.

As shown in the FIG. 6, the first connector electrode 35, which is connected with the extended portion 51, is placed outside of contour of the scanning line 11 to avoid any overlapping with the scanning line 11. Reason for such placing is as follows; short circuit between the scanning line and the float pattern for storage capacity has been a problem as mentioned earlier; in view of this, it is natural to set a construction to avoid smaller yield due to the short circuit.

Such construction, however, results in a smaller aperture ratio by the extent of a space for the tandem repair circuit 6. In order for minimizing decrease of the aperture ratio, a gap between the extended portion 51-1 and the pre-scan-row pixel electrode 5-1 seems to be narrowed. However, in such case, there occurs a problem, after a patterning process for forming pixel electrodes, that etching residue may remain in the gap and may cause short circuit between the pixel electrodes.

Meanwhile, the array substrate in the prior art does not facilitate another kind of repairing—making the defected pixel as black in an array substrate for a normally white mode flat-pane display device. Such repairing is to be effected by short-circuiting the pixel electrode 5-1 paired with a defected TFT 9 onto the pre-scan-row scanning line 11-2.

In view of the above drawbacks, it is aimed to minimize decreasing of the aperture ratio resulted by placing the tandem repair circuit and in same time to prevent short circuit between pixel electrodes. In this case, matrix array substrate on subject is for flat-panel display device and has a tandem repair circuit, which is for connecting a storage-capacity-forming extended portion of a defected pixel electrode to next pixel electrode.

Further, it is aimed to facilitate a repair process of converting a luminous dot (bright defect) to a dark dot (unlit dot) when the matrix array substrate is for normally white mode flat-panel display device.

BRIEF SUMMARY OF THE INVENTION

First aspect of invention-wise array substrate comprising: scanning lines arranged substantially in parallel; signal lines arranged substantially perpendicular to the scanning lines; pixel electrodes each being arranged on a respective patch in a matrix formed by the scanning and signal lines; each switching element being disposed at around intersection of one of the scanning lines and one of the signal lines and inputting signal to respective one of the pixel electrodes from said one of signal lines in accordance with electric current on said one of scanning lines; a storage-capacity-forming extended portion that is extended from said one of pixel electrodes and overlaps said one of scanning lines with an insulator film therebetween; and a tandem repair circuit; said tandem repair being comprised of; first connector electrode connected with the storage-capacity-forming extended portion; second connector electrode being distanced from the first connector electrode and connected with another one of the pixel electrodes; third connector electrode disposed as bridging over the first connector electrode to the second connector electrode; and a contact hole passing through an insulator film for electrically connecting the first connector electrode to the storage-capacity-forming extended portion, said contact hole being placed within contours of said one of scanning lines.

This feature suppresses a decrease of aperture ratio of pixel dot that would have arisen due to placing a tandem repair circuit and in same time prevents short-circuiting between pixel electrodes.

In a preferred embodiment, said first connector electrode is comprised of; a thin-width wiring portion extending from an area above said third connector electrode to an area above said one of scanning line and substantially perpendicularly crossing a contour of said one of scanning lines; and a thick-width wiring portion being connected with an end of said thin-width wiring portion and located within contours of said scanning lines.

By this feature, no substantial deviation of storage capacity for the pixel electrode occurs even when aligning for patterning is deviated.

In a further preferred embodiment, said thick-width wiring portion has a size along the scanning line larger than width of the scanning line.

By this feature, short-circuiting between the scanning line and the first connector electrode is suppressed because overlapping area in which the first connector electrode overlaps the scanning line becomes small enough.

Second aspect of invention-wise array substrate comprising: a first wiring layer pattern including scanning lines gate electrodes arranged on an insulator substrate; a gate insulator film covering the first wiring layer pattern; a second wiring layer pattern including signal lines and source and drain electrodes; light reflective pixel electrodes each being connected with respective one of the source electrodes; and a storage-capacity-forming extended portion being extended from first of the pixel electrode towards second of the pixel electrode, said first pixel electrode being interposed between first and second ones of the scanning lines and being supplied with a signal in accordance with an applied current on the first scanning line, said second pixel electrode being supplied with a signal in accordance with an applied current on the second scanning line, and said storage-capacity-forming extended portion overlapping the second scanning line with an insulator film therebetween; further comprising: an island pattern being included in said second-layer wiring pattern and disposed within an overlapping area in which said storage-capacity-forming extended portion overlaps said second scanning line, and said island pattern having a size along said second scanning line larger than width of said second scanning line.

By this feature, a repair process of converting a luminous dot to a dark dot is facilitated when the matrix array substrate is for normally white mode flat-panel display device.

DETAILED DESCRIPTION OF THE INVENTION

Figure 1:
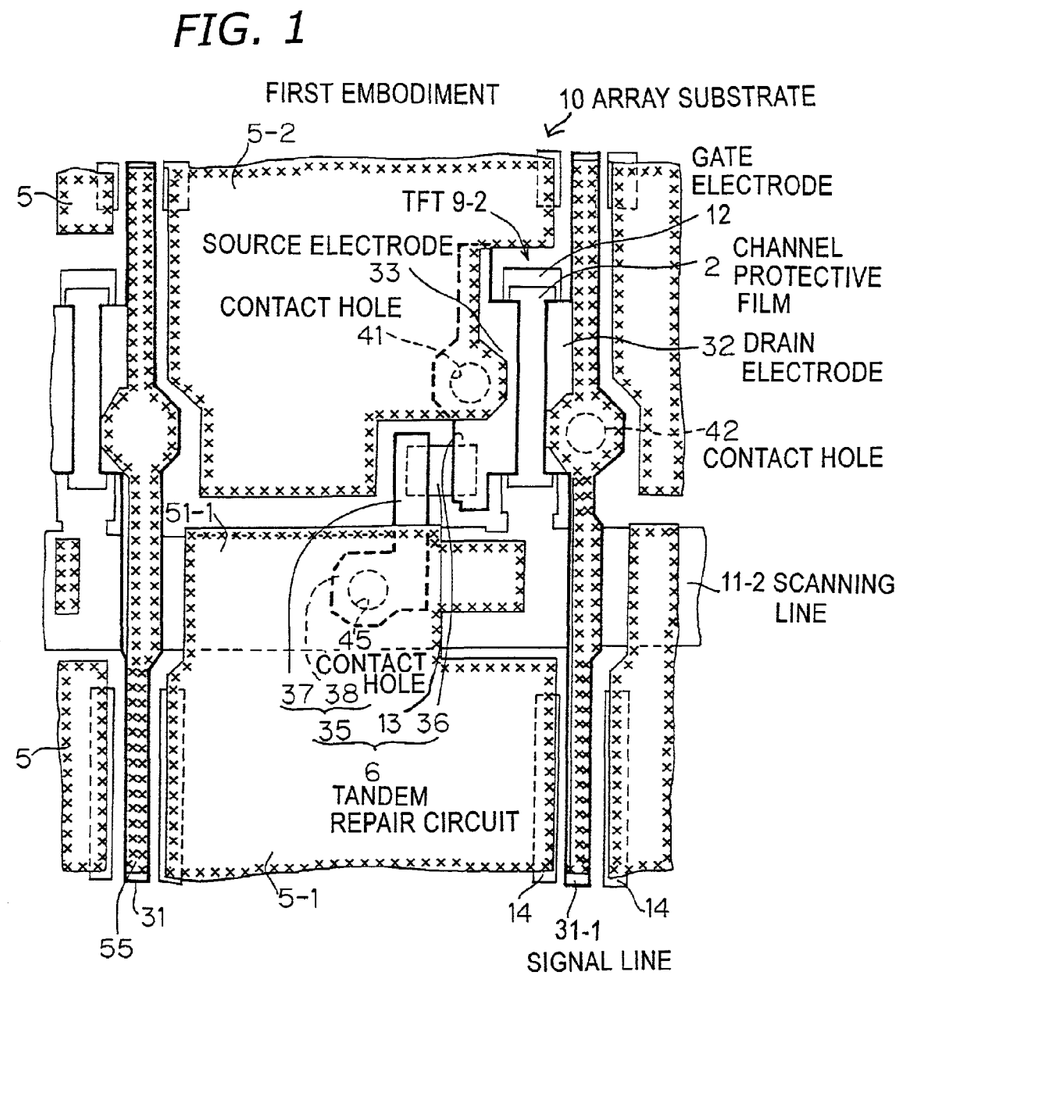
FIG. 1 is a schematic partial plan view showing a construction of a pixel area on an array substrate of the first embodiment.
Figure 2:
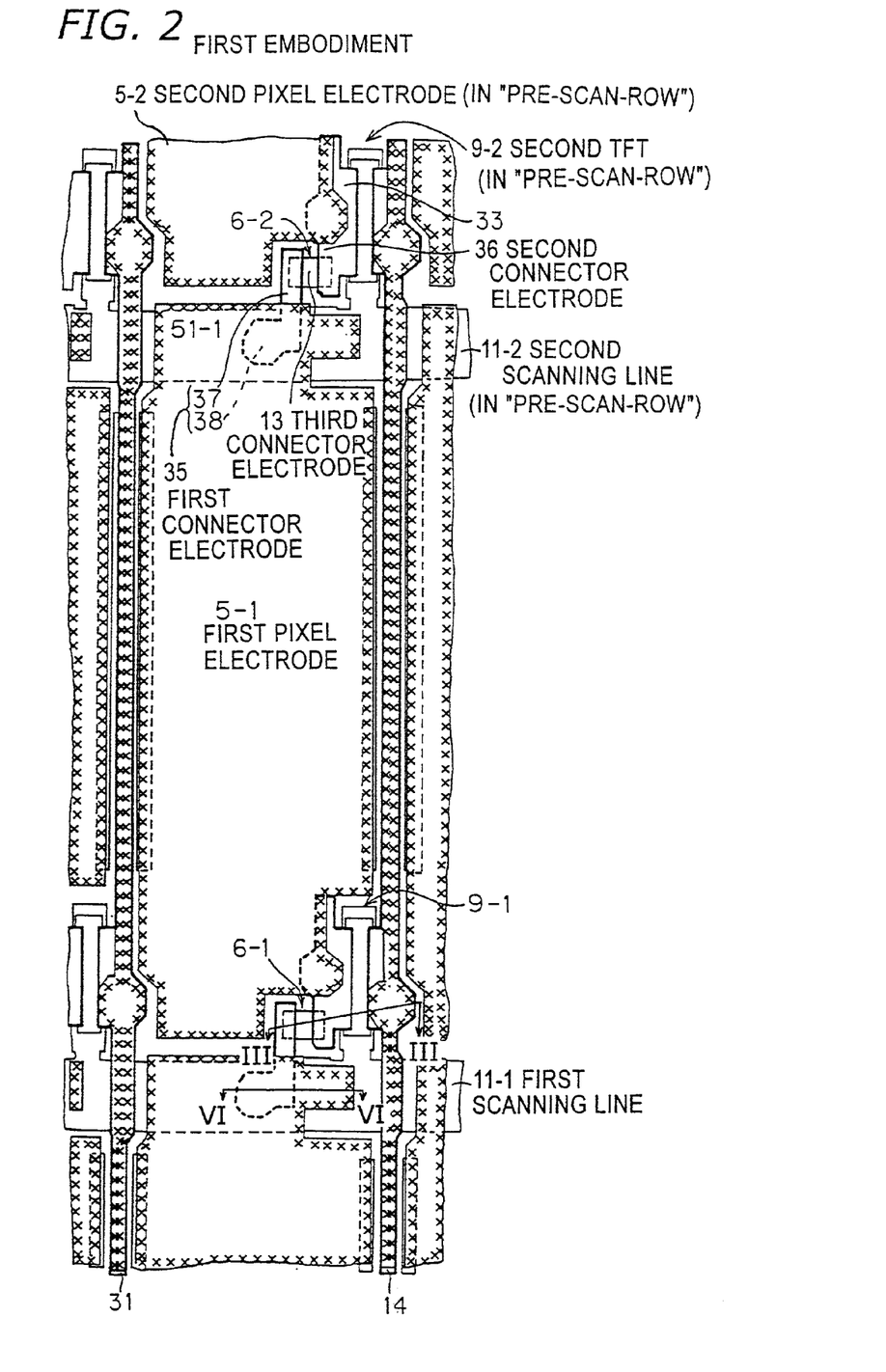
FIG. 2 is a schematic partial plan view showing a full outline of one pixel, in a same manner of the FIG. 1.
Figure 3:
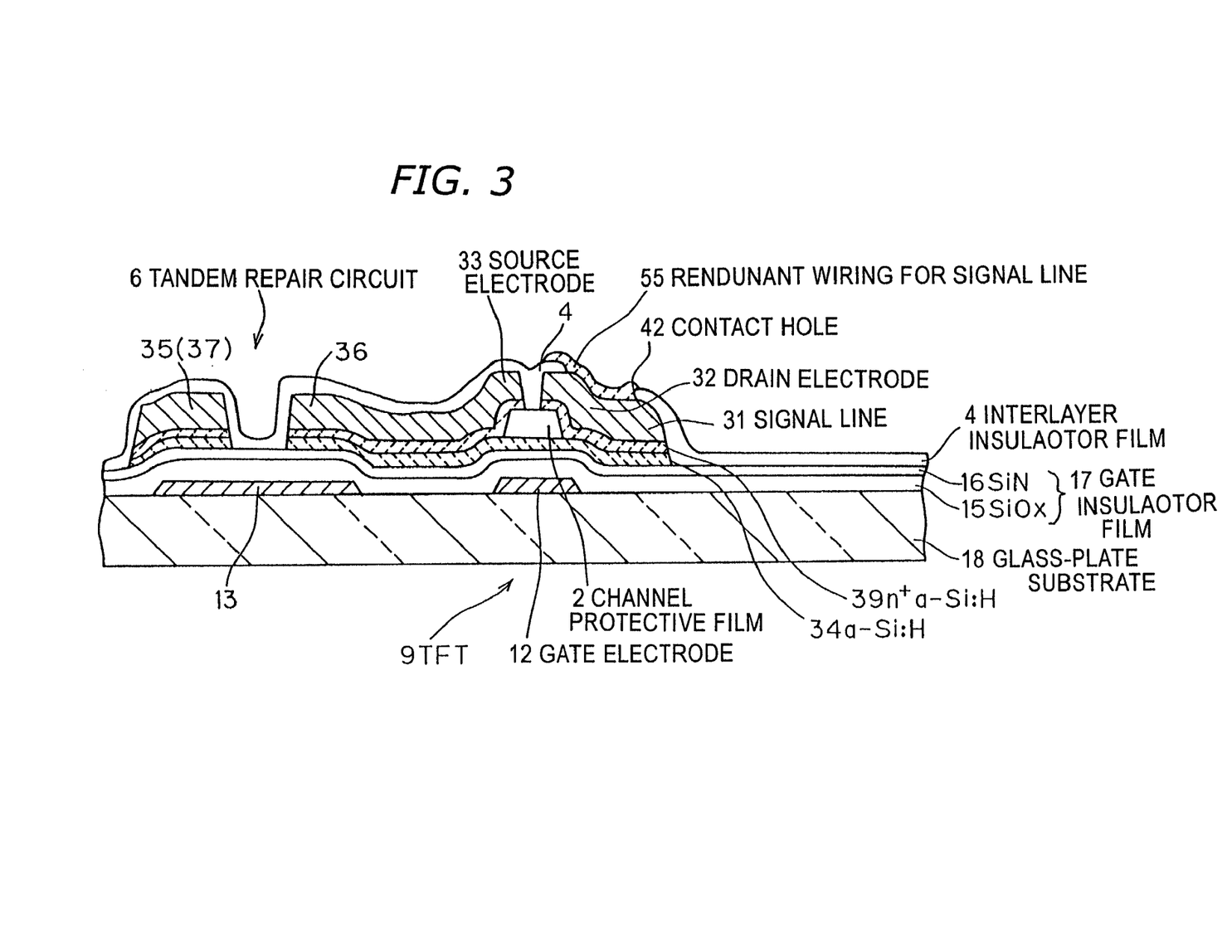
FIG. 3 is a partial sectional view showing multi-layer structure at around TFT (along a III—III line on the FIG. 2), in the array substrate of the first embodiment.
Figure 4:
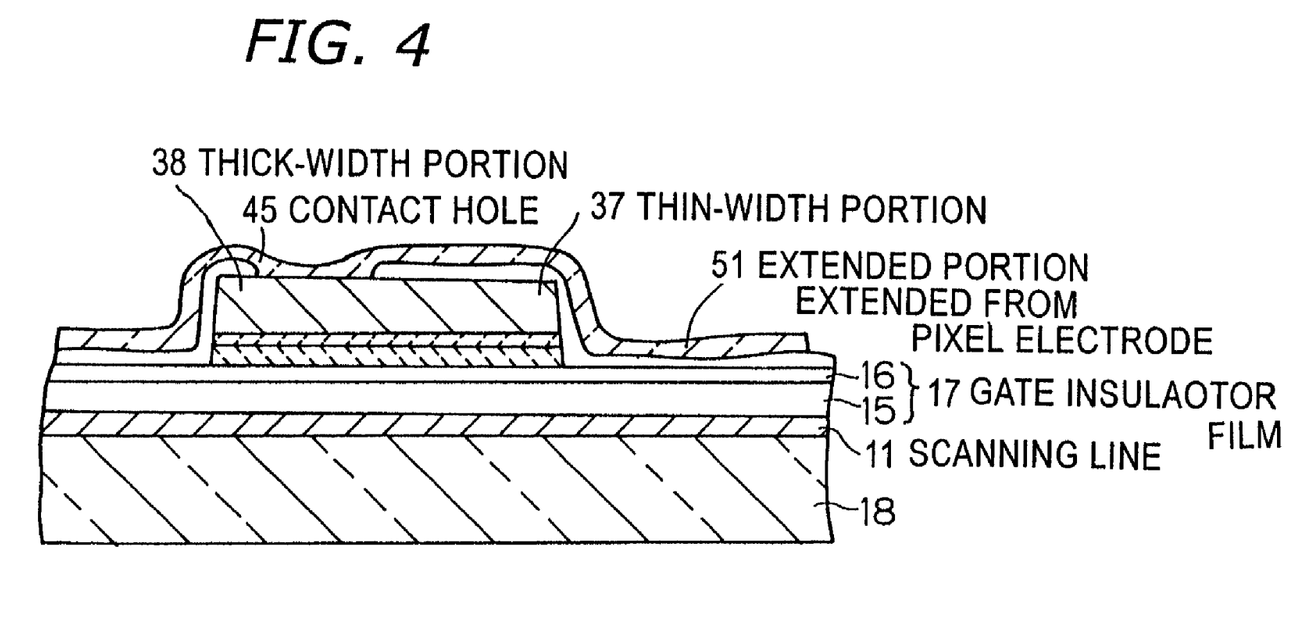
FIG. 4 is a partial sectional view showing multi-layer structure at first connector electrode and a contact hole for tandem repair circuit (along a IV—IV line on the FIG. 2), in the array substrate of the first embodiment.

The first embodiment of the present invention will be described with reference to FIGS. 1 through 4. FIGS. 1 and 2 are schematic partial plan views showing a pixel area on an array substrate. FIG. 3 shows a multi-layer structure or laminated structure at around TFT (along a III—III line on the FIG. 2), while FIG. 4 shows a multi-layer structure at first connector electrode and a contact hole for tandem repair circuit (along a IV—IV line on the FIG. 2).

A flat-panel display device of the first embodiment is an XGA-TFT-type transmission liquid crystal display device having a (actual) view area of 13.3-inch diagonal size and is of a normally white mode.

The array substrate 10 of the flat-panel display device has 1024×3 signal lines 1 and 768 scanning lines as perpendicular to each other. A lower-layer metal wiring pattern including the scanning lines 11 and gate electrodes 12 is formed of a single layer of Molybdenum-tungsten (Mo—W) alloy and is entirely covered by a gate insulator film 17.

On each of pixel-dot aperture defined by the scanning and signal lines 11, 31, a TFT 9 is disposed as a switching element at proximity of intersection of the scanning and signal lines 11, 31. The TFT 9 is of reverse-stagger type and has a gate electrode 12 that is extended from the scanning line 11. At above the gate electrode 12, there is disposed a patch of amorphous silicone (a-Si:H) layer 34, which is a semiconductor-functioning layer, with the gate insulator film 17 therebetween. On the amorphous silicone layer 34, a channel protective layer 2 is disposed to cover channel area at middle part of the TFT 9. At outside of the middle part, the amorphous silicone layer 34 is covered by a phosphorous-doped amorphous silicone layer (n⁺a-Si:H) 39, which acts as an ohmic contact layer. At upon the ohmic contact layer, a source electrode 33 and a drain electrode 32, which are formed of aluminum, are disposed. The upper-layer metal wiring pattern including the source and drain electrodes 33, 32 is entirely covered by an interlayer insulator film 4 formed of silicone nitride.

On and above the interlayer insulator film 4, a pixel electrode 5 is disposed to each pixel-dot aperture and electrically connected to the source electrode 33 through a contact hole 41 that is a through hole on the interlayer insulator film 4.

As shown in the FIG. 2, an extended portion 51 is formed on each pixel electrode 5 at its furthest edge from the TFT 9 connected thereto, for forming a storage capacity in conjunction with the scanning line 11. Details are as follows. Among two scanning lines 11-1, 11-2 sandwiching first pixel electrode 5-1, first scanning line 11-1 (at bottom part of the figure) drives switching of first TFT 9-1 that is connected to the first pixel electrode 5-1. Onto second scanning line 11-2 (at upper side of the figure) among the two, an extended portion 51-1 is extended from the first pixel electrode 5-1 and superimposed to form a storage capacity (Cs) for the first pixel electrode 5-1. The extended portion 51-1 extends to just pass over the second scanning line 11-2 for "pre-scan-row" pixels. Thus, the extended portion 51-1 covers a contour 11b defining the "pre-scan-row" pixel-dot aperture, of the second scanning line 11-2. The "pre-scan-row" means a previous row or previously scanned row of pixels in a sequence of scanning operation in the flat-panel display device.

A tandem repair circuit 6-2 is disposed between second pixel electrode 5-2 in the pre-scan row and the first pixel electrode 5-1. When a TFT 9-2 for the pre-scan-row pixel is defected or malfunctioned, the tandem repair circuit 6-2 serves for electrically connecting the first and second pixel electrodes 5-1 and 5-2 to each other.

The tandem repair circuit 6-2 is comprised of: first connector electrode 35 connected with the extended portion 51-1, which is extended from the first pixel electrode 5-1; second connector electrode 36 connected with the second pixel electrode 5-2; and third connector electrode 13 bridging across the first and second connector electrodes 35 and 36.

The first connector electrode 35 is an independent pattern that has been simultaneously formed with the source and drain electrodes 33, 32 and belongs to the upper-layer metal wiring pattern (see FIGS. 1 and 3). The second connector electrode 36 is extended from the source electrode 33. The third connector electrode 13 is a float pattern, which has been simultaneously formed with the gate electrodes 12 and the scanning lines 11, and belongs to the lower-layer metal wiring pattern.

As shown in the FIG. 1, the first connector electrode 35 is comprised of: a thin-width wiring portion 37 that is extended in a direction along the signal line 31 and traverses a contour 11b of the scanning line 11 as substantially in perpendicular with the scanning line 11; and a thick-width wiring portion 38 in a shape of substantially solid circle, which is disposed substantially at middle in width of the scanning line 11. The thick-width wiring portion 38 has a size to accommodate a contact hole 45 for electrically connecting with the first pixel electrode 5-1. In an illustrated example, diameter of the thick-width wiring portion 38 is about 0.6 times of width of the scanning line 11.

The thin-width wiring portion 37 of the first connector electrode 35 has an end continuous with one side of the thick-width wiring portion 38, which one side faces towards one signal line 31-1 that is associated with driving of the very TFT 9-2. Another end of the first connector electrode 35 overlaps an end portion of the third connector electrode 13. Meanwhile, the second connector electrode 36 extends from the source electrode 33 of the TFT 9-2 in a direction along the signal line 31 as to overlap another end portion of the third connector electrode 13. The first and second connector electrodes 35, 36 are in parallel and have a constant distance from each other. In an illustrated example, the distance between the first and second connector electrodes 35, 36 is substantially same with a distance between the source and drain electrodes 33, 32.

As shown in the FIGS. 1 and 2, when to design a tandem repair circuit 6, the thick-width portion 38 of the first connector electrode 35 is placed within an area covering the scanning line 11. Thus, according to this embodiment, it is able to enhance the aperture ratio, substantially by extent of area of the thick-width portion 38. Even with this advantage, probability of interlayer short-circuiting will be so small that no substantial problem will be given rise to, because an area of the scanning line 11 overlapping with the first connector electrode 35 is small compared with the area of the extended portion 51.

In following, an explanation in outline will be made on manufacturing process of the array substrate 10, in reference with the FIGS. 1 to 4.

(1) First Patterning

On a glass-plate substrate 18 (see FIGS. 3 and 4), metal film, for example a molybdenum-tungsten alloy (Mo—W) film is deposited by sputtering technique. Then, scanning lines 11 as well as gate electrodes 12 extended from the scanning lines 11 are formed. In same time, there is formed each float pattern to serve as the third connector electrode 13, which is a bridging portion of the tandem repair circuit 6.

Further, simultaneously with the scanning lines 11 and so on, a pair of band-shaped float patterns 14 is formed to pinch each area to dispose a thin-width wiring part of the signal line 31. The "thin-width wiring part" is meant as a part other than a drain-electrode forming portion, of the signal line 31. As shown in FIG. 4, the band-shaped float pattern 14 eventually overlaps with fringe of the pixel electrodes 5 and serves for light shielding and for partly forming a storage capacitor.

(2) Second Patterning

By using plasma chemical vapor deposition (CVD) techniques, following films are sequentially deposited—a first gate insulator film 15 formed of silicon oxide ($SiO_x$); a second gate insulator film 16 formed of silicon nitride ($SiN_x$); an amorphous silicone film (a:Si—H) to serve as semiconductor-functioning film for the TFT 9; and finally another silicon nitride film.

Then, such another silicon nitride film is subjected to a patterning to form a channel protective film 2 at channel portion of the each TFT 9.

(3) Third Patterning

By using a plasma chemical vapor deposition (CVD) technique, a phosphorus-doped amorphous silicon (n+a-Si: H) film is deposited. Then, by a sputtering technique, a low-melting-point metal layer, for example an aluminum (Al) film, is deposited. By patterning the metal layer and the phosphorus-doped amorphous silicon film using a single resist pattern, there are formed; signal lines 31; drain electrodes 32 extended from the signal-line lower wirings 31; and source electrodes 33.

In same time, as to form each tandem repair circuit 6, there are formed; the fist connector electrode 35 as an independent pattern; and the second connector electrode 36 as extended from the source electrode 33.

(4) Fourth Patterning

An interlayer insulator film 4 formed of silicon nitride is deposited. Then, following contact holes are formed on each dot of pixel—first contact hole 41 for connecting the source electrode 33 to the pixel electrode 5; second contact hole 45 for connecting the extended portion 51 of the pixel electrode 5 to the first connector electrode 35; and third contact hole 42 at around the drain electrode 32, for connecting the signal line 31 to a redundant wiring 55 that is simultaneously formed with the pixel electrode 5.

(5) Fifth Patterning

A transparent electric-conductive film, for example a film of indium-doped tin oxide film, is deposited. Then, a patterning is made to form pixel electrodes 5; extended portions 51 thereof; and the redundant wiring 55 for the signal lines 31.

Thus, manufactured array substrate 10 is subjected to inspection. When dot defect caused by malfunction of certain TFT 9-2 is found, the array substrate 10 is repaired as follows.

When a dot defect is found on a pre-scan-row dot in respect of one pixel dot, LASER light irradiation is made on a tandem repair circuit 6-2 of the pre-scan-row dot, as to connect two pixel electrodes 5-1,5-2 of the one dot and the pre-scan-row dot. Details are as follows. The LASER light irradiation is started to be applied from an area where the first connector electrode 35 overlaps the third connector electrode 13. And, the irradiation is continued to be applied to an area where the second connector electrode 36 overlaps the third connector electrode 13. By such LASER light irradiation, at the area of overlapping of electrodes, metal aluminum or the like that constitute the first and second connector electrodes 35,36 is melted while insulator films are removed. In this way, electrical connections between overlapped electrodes are achieved.

According to the array substrate 10 of this embodiment, a defect pixel dot is easy to be repaired by a "to-dark-dot converting", instead of the above described, "tandem connecting" of two pixel electrodes. The "to-dark-dot converting" is a repairing of a luminous dot (bright defect), that is a constantly white dot in a normally white mode flat-panel display device. When the luminous dot is converted to a dark dot, which is a constantly black dot, the dot becomes far less recognizable.

According to the array substrate 10 of this embodiment, the first connector electrode 35 is formed of a low-melting-point metal as simultaneously with the signal line 31, and overlaps the scanning line 11. Thus, by irradiating this overlapped area with a LASER light, a pixel electrode 5 of dot defect is easy to be short-circuited to the scanning line 11. Details are as follows; when the first TFT 9-1 for the first pixel electrode 5-1 is defected, the second scanning line 11-2 is electrically connected to the thick-width portion 38 of the first connector electrode 35 in the tandem repair circuit 6-2 that is located between the first and second pixel electrodes 5-1,5-2. In this way, the first pixel electrode 5-1 is electrically connected to the second scanning line 11-2, through a contact hole 45 and the thick-width portion 38. Such connection of the scanning line 11 and the pixel electrode 5 makes a defected pixel dot to become a dark dot in a normally white mode flat-panel display device, because the scanning lines 11 are supplied with an electric potential that differs greatly from that of a counter electrode.

In recent years, flat-panel display devices are driven with high-frame frequency in some cases, to cope with requirement for higher displaying quality. In such case, at predominating chances, the to-dark-dot converting is more appropriate than the tandem connecting. When tandem connecting is made, one TFT 9-1 supplies two pixel electrodes 5-1,5-2 with pixel-dot electric potential. Thus, if a liquid-crystal display device is driven with high-frame frequency, electric voltage applied to the two pixel electrodes 5-1,5-2 may become considerably lower than that of the other pixel electrodes. Hence, brightness of the tandem connected pixel dots may become far higher than other pixel dots, at normally white mode.

Such to-dark-dot converting is difficult to apply on an array substrate of prior art as shown in FIG. 6, because the first connector electrode 35 formed of low-melting point metal does not overlap the scanning line 11 at all. Further, by the LASER light irradiation, a pixel electrode 5 formed of the ITO is not able to be directly connected with the scanning line 11.

According to the embodiment, as explained hereto, by using an exactly same construction of the array substrate, it is able to cope with dot defects in a liquid-crystal display device driven by high frame frequency as well as in a liquid-crystal display device driven by rather low frame frequency.

Figure 5:
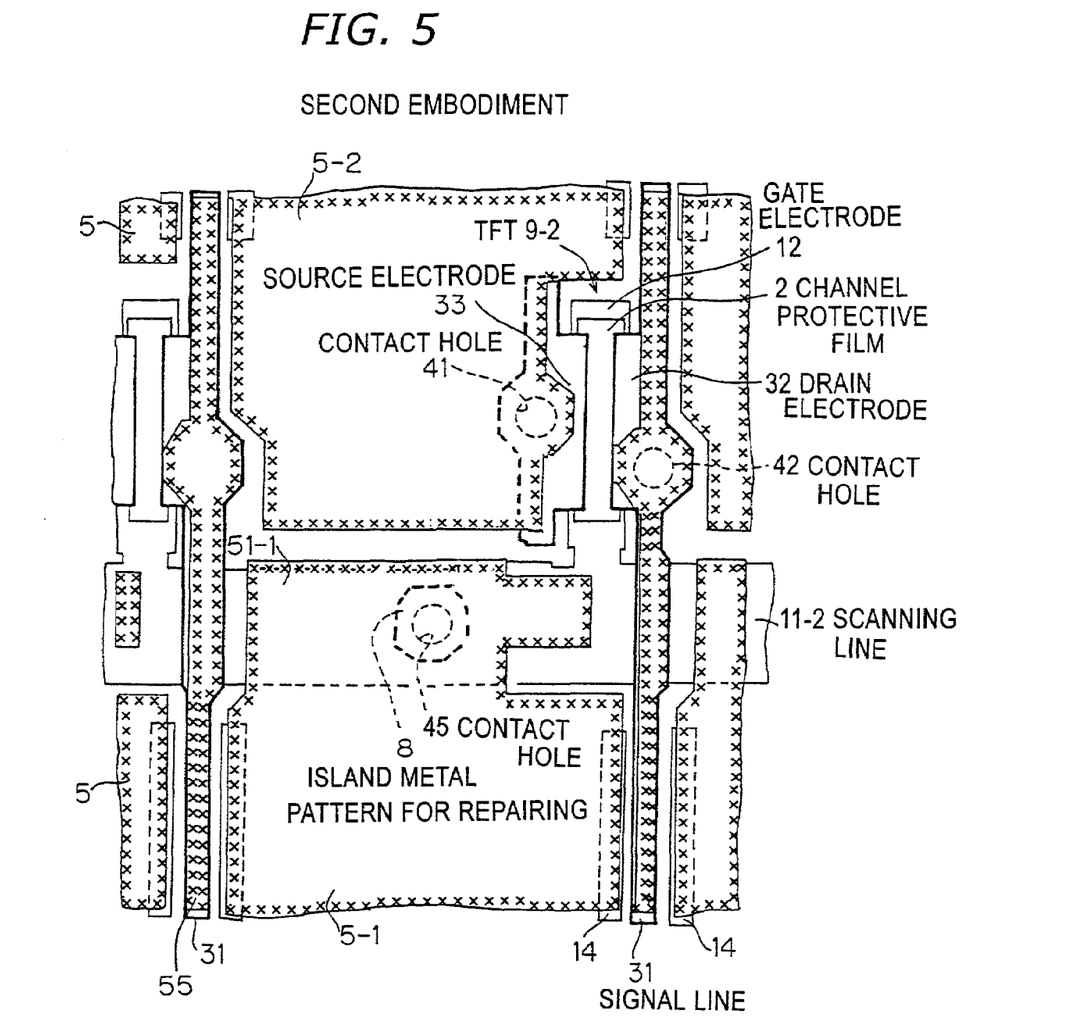
FIG. 5 is a schematic partial plan view corresponding the FIG. 1, showing a construction of a pixel area on an array substrate of the second embodiment.

The second embodiment of the present invention will now be described with reference to FIG. 5.

The array substrate of this embodiment has no tandem repair circuit and has an island metal pattern 8 for repairing that is tantamount to thick-width portion 38 in the tandem repair circuit of the first embodiment. The other construction of the array substrate is same with that of the first embodiment. That is, the array substrate of the second embodiment has a construction that is modified from that of the first embodiment in such a way—omitted with the third connector electrode 13 for serving as a bridging part for the tandem repair circuit 6; omitted with the thin-width portion 37 of the first connector electrode 35 which extends into a pixel-dot aperture; and the pixel electrode extends to the omitted areas.

The island metal pattern 8 for repairing is electrically connected with the extended portion 51 of the pixel electrode 5 through a contact hole 45 piercing an insulator film, as in a same manner with the first embodiment. The island metal pattern 8 is placed within contours of the scanning line 11 and has a size almost minimum for accommodating the contact hole 45, as in the thick-width portion 38 in the first embodiment.

In the illustrated example, the island metal pattern 8 is formed as a substantially solid circle pattern and has a diameter somewhat larger than that of the contact hole 45, which also is formed as a substantially solid circle shape. Nevertheless, the island metal pattern 8 may be rectangular or in other shape.

According to the array substrate of the second embodiment, the to-dark-dot converting is facilitated, and in same time, interlayer short-circuiting is prevented between the island metal pattern and the scanning line.

Although tandem connecting is not feasible for the array substrate of the second embodiment, aperture ratio of the pixel dot become higher by an extent of area for the third connector electrode 13 or the like of the tandem repair circuit 6, as compared with the first embodiment. Therefore, the array substrate of the second embodiment is more preferable when to use in a way to-dark-dot converting is more appropriate.

Further, according to the second embodiment, the LASER light irradiation is not required in connecting the island metal pattern 8 to the extended portion 51 because they are already connected through the contact hole 45, as in same manner with the thick-width portion 38 in the first embodiment. In occasion that a dot defect is found, the repairing is easily achieved when merely the scanning line 11 and the island metal pattern 8 are connected to each other, by irradiating the array substrate from its back side (glass-plate substrate side) with LASER light, even after completion of the array substrate.

If such LASER light irradiation is made from front side (wiring pattern side) of the array substrate after its completion, LASER light has to pass through an alignment layer or protection film at the top of the layers, an ITO film forming the extended portion, and interlayer insulator film 4. Thus, process burden for repairing is increased and in same time, probability of failure of repairing or insufficient repairing is increased.

Meanwhile, the contact hole 45 may be omitted without causing difficulty for the to-dark-dot converting, if some condition such as type of the array substrate or LASER irradiation appliance are met. When the contact hole 45 is omittable, sizes of the island metal pattern 8 is able to be minimized to an extent needed for repairing by the LASER irradiation. Thus, it is able to further reduce a probability of undesirable short-circuiting between the island metal pattern 8 and the scanning line 11, as well as an undesirable formation of electric capacity.

CROSS-REFERENCE TO RELATED APPLICATIONS

This application is based upon and claims the benefits of priority from the prior Japanese Patent Applications No. 2000-208614 filed on Jul. 10, 2000 and No. 2000-319948 filed on Oct. 19, 2000; the contents of which are incorporated herein by reference.

What is claimed is:

1. A matrix array substrate comprising:
scanning lines arranged substantially in parallel;
signal lines arranged substantially perpendicular to the scanning lines;
pixel electrodes each arranged on a respective patch in a matrix formed by the scanning and signal lines;
a switching element disposed at or around an intersection of one of the scanning lines and one of the signal lines and configured to input a signal to a respective one of the pixel electrodes from said one signal line in accordance with an electric current on said one scanning line;
a storage-capacity-forming extended portion extended from a first one of the pixel electrodes towards a second of one of the pixel electrodes, said first pixel electrode being interposed between first and second ones of the scanning lines and configured to be supplied with a signal in accordance with an applied current on the first scanning line, said second pixel electrode configured to be supplied with a signal in accordance with an applied current on the second scanning line, and said storage-capacity-forming extended portion overlapping the second scanning line with an insulator film therebetween;
a tandem repair circuit comprised of,
a first connector electrode connected with the storage-capacity-forming extended portion extended from the first pixel electrode,
a second connector electrode distanced from the first connector electrode and connected with said second pixel electrode,
a third connector electrode bridging over the first connector electrode to the second connector electrode, and
a contact hole passing through the insulator film and electrically connecting the first connector electrode to the storage-capacity-forming extended portion, said contact hole being placed within contours of said second scanning line, said first connector electrode comprising,
a thin-width wiring portion extending from an area above said third connector electrode to an area above said one scanning line and substantially perpendicularly crossing a contour of said one scanning line; and
a thick-width wiring portion connected with an end of said thin-width wiring portion and located within contours of said scanning lines.

2. A matrix array substrate according to claim 1, said thick-width wiring portion having a size along said one scanning line larger than a width of said one scanning line.

3. A matrix array substrate according to claim 2, wherein said size of the thick-width wiring portion is substantially equal to a sum of a size of said contact hole and a margin configured to absorb a deviation of alignment during patterning of said contact hole.

4. A matrix array substrate according to claim 1, wherein said third connector electrode is included in a first-layer metal pattern and formed simultaneously with the scanning lines, and said first and second connector electrodes are included in a second-layer metal pattern and formed simultaneously with the signal lines.

5. A matrix array substrate according to claim 4, wherein said second-layer metal pattern is formed of aluminum metal or an aluminum alloy.

6. A matrix array substrate according to claim 4, wherein said pixel electrodes and said storage-capacity-forming extended portions are included in a pattern of transparent electric-conductive material, disposed in a layer above said first- and second-layer metal patterns.

* * * * *